United States Patent [19]
Pence

[11] Patent Number: 5,235,695
[45] Date of Patent: Aug. 10, 1993

[54] APPARATUS FOR EFFICIENT UTILIZATION OF REMOVABLE DATA RECORDING MEDIA

[75] Inventor: Jerry W. Pence, Tucson, Ariz.

[73] Assignee: International Business Machines Corporation, Armonk, N.Y.

[21] Appl. No.: 880,416

[22] Filed: May 8, 1992

Related U.S. Application Data

[60] Division of Ser. No. 821,839, Jan. 14, 1992, which is a continuation of Ser. No. 372,745, Jun. 28, 1989, abandoned.

[51] Int. Cl.$^5$ .................. G06F 15/74; G06F 5/00; G06F 12/00
[52] U.S. Cl. .................. 395/425; 360/96.1; 360/134; 364/238.3; 364/248.1; 364/236.2; 364/248.2; 364/236.3; 364/236.6; 364/260.6; 364/DIG. 1
[58] Field of Search .............. 395/425, 250, 575, 275, 395/600, 775; 360/55, 69, 85, 90, 95, 134; 369/14, 15, 47; 358/261.1; 370/109; 341/60, 87, 95; 340/825.06

[56] References Cited

U.S. PATENT DOCUMENTS

| | | | |
|---|---|---|---|
| 4,574,351 | 3/1986 | Dang et al. | 364/200 |
| 4,586,027 | 4/1986 | Tsukiyama et al. | 340/347 DD |
| 4,638,424 | 1/1987 | Beglin et al. | 364/200 |
| 4,771,375 | 9/1988 | Beglin et al. | 364/200 |
| 4,811,132 | 3/1989 | Hunter et al. | 360/74.3 |
| 4,849,878 | 7/1989 | Roy | 364/200 |
| 4,891,784 | 1/1990 | Kato et al. | 364/900 |
| 4,974,189 | 11/1990 | Russon et al. | 364/900 |
| 5,167,034 | 11/1992 | MacLean, Jr. et al. | 395/575 |

OTHER PUBLICATIONS

IBM Technical Disclosure Bulletin, vol. 24, No. 9, Feb. 1982, p. 4483.

Primary Examiner—Michael R. Fleming
Assistant Examiner—Gopal C. Ray
Attorney, Agent, or Firm—M. W. Schecter; F. E. Anderson

[57] ABSTRACT

An apparatus for efficiently utilizing data recording media performs data compression beneath the level of the host processor is disclosed. To improve the ability of a recording media to be copied without increasing host processor overhead, the control unit which sees the compressed data is checked only upon recording a predetermined amount of uncompressed data. At such time, a compression ratio is calculated for the current data set and is used to monitor the recording of the remaining data of the current data set in compressed form. When a predetermined amount of compressed data is estimated to be recorded, the predetermined amount being the minimum storage capacity of a recording media, recording begins on a new recording media. Recording media spanning is reduced by checking counters in the storage device control unit only upon completion of recording an entire data set, and then using the uncompressed size of the next data set to be recorded to determine whether or not to continue recording on the same or a new cartridge.

10 Claims, 2 Drawing Sheets

APPARATUS FOR EFFICIENT UTILIZATION OF REMOVABLE DATA RECORDING MEDIA

This application is a divisional of application Ser. No. 07/821,839, filed Jan. 14, 1992, which is a continuation of application Ser. No. 07/372,745, filed Jun. 28, 1989, now abandoned.

BACKGROUND OF THE INVENTION

1. FIELD OF THE INVENTION

The present invention relates to an apparatus for efficiently utilizing data recording media in a data processing system. More particularly, the invention relates to improving the ability of a recording media to be copied and for reducing recording media spanning.

2. DESCRIPTION OF THE RELATED ART

Modern computers require a host processor including one or more central processing units and a memory facility. The processor manipulates data stored in the memory according to instructions provided to it. The memory must therefore be capable of storing data required by the processor and transferring that data to the processor at a rate capable of making the overall operation of the computer feasible. The cost and performance of computer memory is thus critical to the commercial success of the computer system.

Because today's computers require large quantities of data storage capacity, computer memory is available in many forms. A fast but expensive form of memory is main memory, typically comprised of microchips. Other available forms of memory are known as peripheral storage devices and include magnetic direct access storage devices (DASD), magnetic tape storage devices, optical recording devices, and magnetic or optical mass storage libraries. Each of these other types of memory has a greater storage density and thus lower cost than main memory. However, these other memory devices do not provide the performance provided by main memory. For example, the time required to mount a tape or disk in a tape drive, DASD, or optical disk drive and the time required to properly position the tape or disk beneath the read/write mechanism of the drive cannot compare with the rapid, purely electronic data transfer rate of main memory. It is inefficient to store all of the data in a computer system on but a single type of memory device. Storing all of the data in main memory is too costly and storing all of the data on one of the peripheral storage devices reduces performance.

A typical computer system includes both main memory and one or more types of peripheral storage devices arranged in a data storage hierarchy. The data storage hierarchy arrangement is tailored to the performance and cost requirements of the user. In such a hierarchy, main memory is often referred to as primary data storage, the next level of the hierarchy is often referred to as secondary data storage, and so on. Generally, the highest level of the hierarchy has the lowest storage density capability, highest performance and highest cost. As one proceeds down through the levels of the hierarchy, storage density generally increases, performance generally decreases, and cost generally decreases. By transferring data between different levels of the hierarchy as required, the cost of memory is minimized and performance is maximized. Data is thus stored in main memory only so long as it is expected to be required by the processor. The hierarchy may take many forms, include any number of data storage or memory levels, and may be able to transfer data directly between any two distinct memory levels. The transfer of data may employ I/O channels, controllers, or cache memories, as are well known in the art.

A variety of techniques are known for improving the efficiency of use of one or more components of a data storage hierarchy. One set of such techniques is known as data "compaction" and similar names. The term compaction has been used in many ways to refer to methods of storing and transmitting data efficiently. One type of compaction improves data transformation by using the minimum number of required bits to represent the most commonly coded characters. Less commonly coded characters may be represented by more than the minimum number of bits required. Overall, this compaction technique allows for a given amount of information to be coded using a minimum number of bits.

Another type of compaction which is frequently used is the coding of data in such a manner as to remove non-changing bits. Sometimes referred to as run length limited (RLL) coding, this type of compaction replaces strings of the same bit with a simple binary representation of the number of bits to be repeated. An example of such a technique is disclosed in U.S. Pat. No. 4,675,750. The patent discloses a video compression system including the removal of superfluous bits, as stored on magnetic tape.

Another technique for data compaction is the elimination of invalid data. Because recorded data may include invalid data subsequently corrected using error correction codes, more data storage space may be required to store the data than that required if no errors existed therein. In the IBM Technical Disclosure Bulletin Vol. 24, No. 9, February, 1982, page 4483, a technique is disclosed for eliminating invalid data from data sets. The technique includes copying only the valid data of a data set when the size of that data set reaches a certain threshold, ignoring the invalid data. The amount of storage space required to store such data is thus reduced.

Yet another compaction technique saves storage space by using fragmented storage space. Fragmentation refers to the unused portions of a recording media which result from frequent accesses to the data sets thereon. During the course of use, various areas of a recording media may be erased or otherwise eliminated from use. However, each contiguous unused recording space on the recording media may be so small as to make it difficult to record an entire data set therein. Compaction techniques are known for copying data sets from one recording media to another to permit the accumulation of several unused recording areas into a single large contiguous recording space. In addition, U.S. Pat. No. 3,787,827 discloses a data recording system in which a recording media is cyclically checked to locate unused spaces therein. Such checking ensures that unused areas in the recording media are eventually used.

Yet another compaction technique is blocking. Blocking is the combination of two or more logical records into a single transferable or recordable entity. The single entity is typically referred to as a block. Blocking reduces the number of inter-record or inter-block gaps which exist between records to permit them to be distinguished from one another. Blocking sacrifices the ability to access logical records individually to achieve a greater recording density. An example of such a blocking technique is shown in U.S. Pat. No. 3,821,703.

The aforementioned data compaction techniques are all directed toward reducing the amount of data storage space required to record a particular amount of information. In addition, the transfer of data in compacted form may improve data transfer rates. Because the term compaction is loosely used to represent any of the aforementioned techniques, the term "compression" will hereinafter be used to refer to any technique that saves data storage space by, for example, eliminating gaps, empty fields, redundancies, or unnecessary data to shorten the length of records or blocks. The penalty for using data compression is the overhead required to convert the data from uncompressed to compressed form and vice versa. The logic required to compress and decompress data may be provided in the host processor. Unfortunately, the compression and decompression of data at the level of a host processor detracts from the ability of the host processor to perform its normal responsibilities. Thus, the logic required to compress and decompress data is sometimes provided in the control units of peripheral storage devices, thereby offloading the responsibility for data compression and decompression from the host processor to the peripheral storage device. Data processing systems having the responsibility for data compression and decompression residing outside of the host processor are shown in IBM Technical Disclosure Bulletin Vol. 22, No. 9, February 1980, pp. 4191-4193 and IBM Technical Disclosure Bulletin Vol. 26, No. 3A, August 1983, page 1281.

Two problems arise when data compression is offloaded to the control unit of a peripheral storage device. The first problem is associated with the ability of a recording media to be copied onto another recording media. For example, consider the IBM 3480 magnetic tape drive, in which the listed storage capacity of a tape cartridge is 200 megabytes. Due to the nature of the tape cartridge production process, the exact length of tape wound in a tape cartridge can only be specified to within a particular tolerance. Thus, the actual storage capacity of a tape cartridge may be slightly greater than 200 megabytes. It is necessary to limit the total recorded data on a tape cartridge to that of the minimum amount of data capacity on the cartridge if the ability to copy the data from one cartridge to another single cartridge is to be guaranteed. If data were recorded until the actual capacity of the cartridge was exceeded (i.e., no tape remained) it would be possible to record more than 200 megabytes on a cartridge, and in turn it would be impossible to copy the entire contents of that tape cartridge to another tape cartridge having a capacity of merely 200 megabytes. Similar problems can occur with other types of data recording media.

Two techniques can be used to ensure that the amount of data recorded on a recording media does not exceed the minimum amount of data storage capacity guaranteed thereon. The first technique is to physically check how much of the recording media has been used throughout recording. Such a technique may come at the expense of heavy overhead or of imprecision. For example, in a tape drive it is known to use tachometers and the like to control tape motion and to track the length of tape on a particular tape reel. Examples of techniques for physically checking how much of a recording media has been used are disclosed in U.S. Pat. Nos. 4,125,881 and 4,811,132. Unfortunately, techniques for physically determining how much of a data recording media has been recorded are not accurate enough to be relied upon for all applications.

The other method for ensuring that no more data than the minimum capacity for a particular recording media is recorded includes monitoring the data as it is recorded. In data processing systems in which data is transferred or stored in uncompressed form, such techniques are reliable. As the data is written to the recording media, it is monitored to keep track of the total amount of data that has been recorded on each media. Because the data is not compressed, the amount of data recorded correlates to the amount of data seen by both the host processor and the storage device control unit. However, in data processing systems which compress data, it is necessary to know the amount of data recorded in compressed form. If the data is compressed within the host processor, there is no problem. Storage management software which runs in the host processor will have access to the data in compressed form and thus have the ability to monitor the amount of data stored in such compressed form. In many of today's data processing systems however, the overhead associated with compressing the data at the level of the host processor has proved too costly. As previously mentioned, the performance of the host processor has been upgraded by offloading the responsibility for compressing the data from the host processor to the peripheral storage device control units. Such offloading not only improves the performance of the host processor, but also permits data compression and decompression to be transparent to the host processor. Different compression algorithms may be used by each peripheral storage device connected to a single host processor so long as that device returns data to the host processor in uncompressed form.

In data processing systems in which compression is done in storage device control units it is impossible for the storage management software operating in the host processor to be aware of the amount of data stored on a recording media in the storage device in compressed form. Although the storage management software still "sees" the data in uncompressed form in the host processor, it is impossible for it to determine the exact amount of recording media space required to store the data when it is compressed. Merely recording until a particular amount of uncompressed data has been recorded could result in the minimum tape capacity being exceeded because the assumed amount of compression was not in fact accurate. Using counters in the storage device control unit, it is possible to monitor the amount of data that is recorded in compressed form. However, constant retrieval of such compressed data information from counters in the storage device control unit to the host processor for access by storage management software again results in costly overhead. There is thus a need for a method of accurately monitoring the amount of compressed data that is stored on a recording media with a minimum of host processor overhead.

The other problem associated with data compression is recording media spanning. It is generally desirable to avoid spanning a data set across multiple recording media because recall of that data set will require the mounting of more than one recording media, or if all required recording media are already mounted, more than one seed of data on those recording media. It is known to simply write data to the end of a recording media and span a data set across multiple recording media if so required when the end of a recording media is reached. However, as libraries of data recording media have grown in modern times, the need to avoid recording media spanning has become more important. Again, as it has become practice to compress data at the level of a storage device control unit it has become more difficult to predict the likelihood that a data set will be required to span across multiple recording media prior to its recording and with a minimum amount of host processor overhead.

SUMMARY OF THE INVENTION

The primary object of the present invention is improved utilization of removable data recording media in a data processing system.

Another object of the present invention is to improve the ability of a recording media in a data processing system to be copied with a minimum of host processor overhead and where data compression is performed beneath the level of the host processor.

Yet another object of the present invention is to reduce recording media spanning of data sets in a data processing system with a minimum of host processor overhead and where such system compresses data at a level beneath that of the host processor.

Yet another object of the present invention is a data processing system including improved methods for both increasing the ability of a recording media to be copied and reducing recording media spanning as previously described.

These and other objects of the present invention are achieved by monitoring methods performed by storage management software. To improve the ability of a recording media to be copied without increasing host processor overhead, the control unit which sees the compressed data is checked only upon recording a predetermined amount of uncompressed data. The amount of uncompressed data recorded can be monitored directly by the host processor. At such time as the predetermined amount of uncompressed data is recorded, the compression ratio for the data set is calculated and used to monitor the recording of the remaining data in compressed form. When a predetermined amount of compressed data is estimated to be recorded, the predetermined amount being the minimum storage capacity of a recording media, recording begins on a new recording media.

The method of reducing recording media spanning without increasing host processor overhead includes checking counters in the storage device control unit only upon completion of recording an entire data set, and then using the uncompressed size of the next data set to be recorded to determine whether or not to continue recording on the same or a new cartridge. If the total of the known compressed data recorded and the uncompressed data to be recorded exceeds the target capacity of the recording media, a new recording media is inserted and the data set is recorded on the new media. The aforementioned methods can also account for inaccuracies in the data provided by the control unit counters.

The foregoing and other objects, features and advantages of the invention will be apparent from the following more particular description of the preferred embodiment of the invention, as illustrated in the accompanying drawing.

DETAILED DESCRIPTION OF THE PREFERRED EMBODIMENT

The invention will now be described as practiced in a multi-host processor data processing environment having a plurality of peripheral data storage devices of diverse types and capabilities. It should be understood that the invention may also be practiced in a single-host processor environment having a smaller number of peripheral data storage devices, or with a variety of different system structures.

Figure 1:
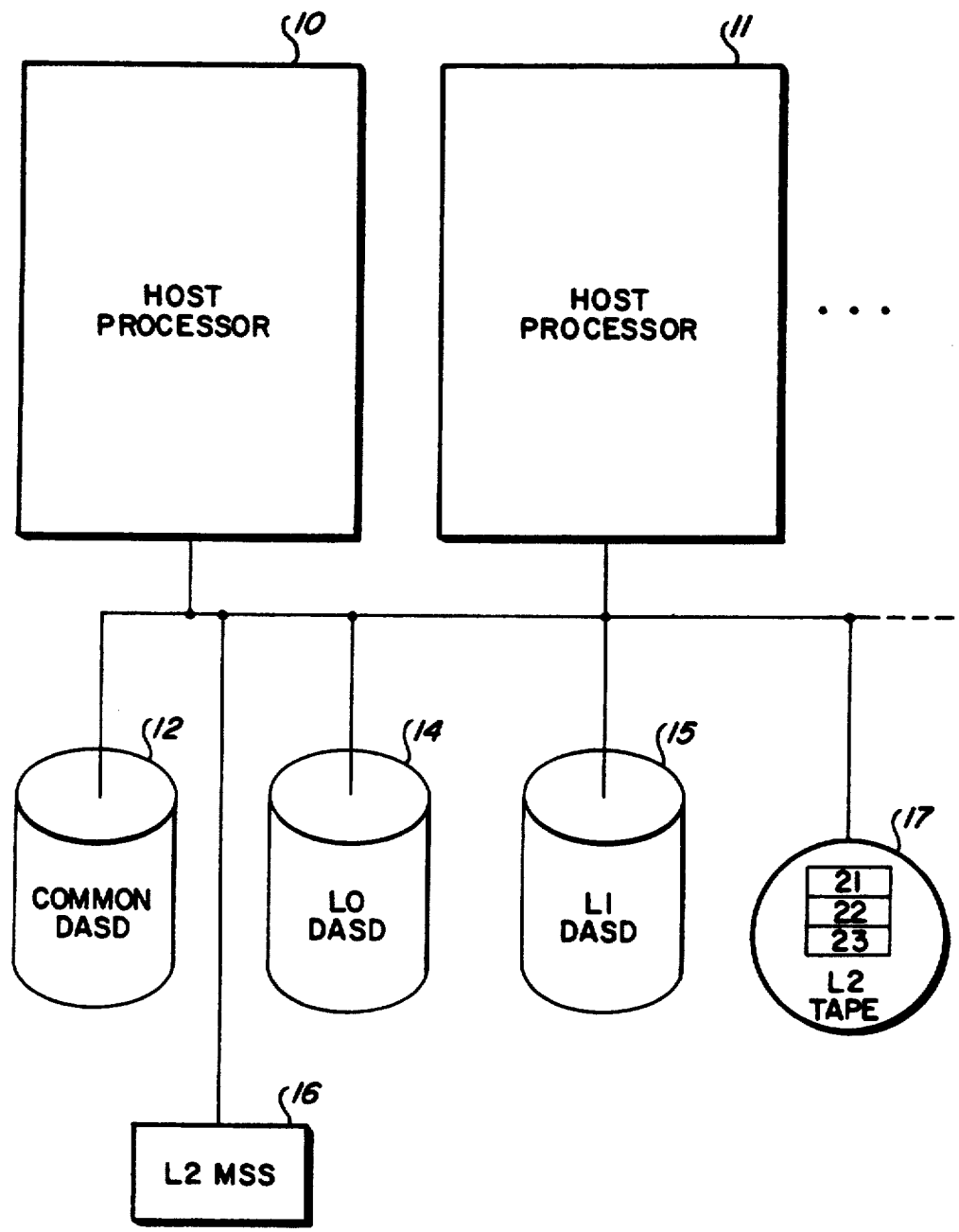
FIG. 1 is a schematic diagram of a multi-host data processing system having a plurality of peripheral data storage devices which can be managed according to the invention.

Referring to FIG. 1, a data processing system in a multi-host environment will now be described. The system includes two or more host processors, a host processor 10 and a host processor 11 being shown in the figure, each of which includes the usual component portions of a host processor, such as the arithmetic logic unit, main memory, and input/output channels (not shown). Each host processor can be either a unit processor or a multi-processor. The host processors employ various operating systems not pertinent to an understanding of the present invention. Within each host processor is a computer program employing the invention, as will be detailed.

Host processors 10 and 11 are connected to a common DASD 12. Common DASD (direct access storage device) 12 consists of a high performance disk-type data storage device. Stored in common DASD 12 are those control data structures (not shown) desired for coordinating operations of host processors 10 and 11 in executing a data storage management program. A high performance DASD 14 labeled L0 DASD, stores those data sets directly accessed by host processors 10 and 11 and receives data sets for storage generated by host processors 10 and 11. A lower performance DASD 15, labeled L1 DASD, stores those data sets accessed by host processors 10 and 11 less frequently than those stored on high performance DASD 14. When the data sets stored in DASD 14 become aged through non-access by host processors 10 and 11 the data storage management program automatically moves data sets from DASD 14 to DASD 15 such that data set access by host processors 10 and 11 is enhanced by keeping only those data sets that are frequently accessed by the host processors in DASD 14. DASD's 14 and 15 represent the first two levels of a data storage hierarchy created by the data storage management program.

A still lower level in the data storage hierarchy is represented by a mass storage system (MSS) 16, labeled L2 MSS, and a tape drive 17, labeled L2 TAPE. MSS 16 and DASD's 12, 14 and 15 provide for automatic accessing of all data sets stored therein. MSS 16 includes one or more means for reading and writing to recording media and automated means for transferring such media between storage cells located in MSS 16 and the means for reading and writing. The recording media may be magnetic tape, magnetic disk, or optical disk and the means for reading and writing may be tape drives or magnetic or optical disk drives as the case may be. MSS 16 may also include means for inserting or removing recording media therein. Tape drive 17 is used for archival or other long term data storage, backup and the like and usually require operator intervention for mounting and demounting tape volumes. The system operator and system console is not shown in FIG. 1 for the purpose of simplification.

In the preferred embodiment, the storage management program including the invention is Hierarchical Storage Manager (HSM), a data facility in the Multiple Virtual Storage (MVS) operating system environment. A general description of HSM may be found in U.S. Pat. Nos. 4,771,375 and 4,638,424; IBM Manual SH35-0085-3, DATA FACILITY HIERARCHICAL STORAGE MANAGER VERSION 2 RELEASE 4.0, "System Programmer's Guide"; IBM Manual SH35-0083-3, DATA FACILITY HIERARCHICAL STORAGE MANAGER VERSION 2 RELEASE 4.0, "System Programmer's Command Reference"; and IBM Manual LY35-0098-1, DATA FACILITY HIERARCHICAL STORAGE MANAGER VERSION 2 RELEASE 4.0, "Diagnosis Guide", the disclosure of which are hereby incorporated by reference. HSM is a continuously running application program and includes instructions residing in host processors 10 and 11. HSM provides for data processing system space management by migrating data sets between the different levels of the data storage hierarchy according to predetermined specifications, and also provides availability management by backing up data sets and dumping volumes of data also according to predetermined or user driven specifications. The subject invention may improve the efficiency of any type of recording media used in a data processing system. As regards FIG. 1, the inventive method will be described with respect to a preferred embodiment when data is being recorded to tape drive 17. More specifically, tape drive 17 is an IBM 3480 magnetic tape drive and the recording media is a magnetic tape cartridge storing a data volume of up to 200 megabytes. The control unit 23 for the tape drive compresses data and maintains counters 21 including certain information about the data written to a tape cartridge since it was last mounted, as will be explained later.

As stated, the data to be recorded is compressed in the tape drive control unit, which acts as a buffer to the tape cartridges. Data compression is performed in accordance with U.S. Pat. Nos. 4,463,342 and 4,467,317, commonly assigned co-pending U.S. patent application Ser. No. 07/372,744, by Dunn, et al., and IBM Technical Disclosure Bulletin Vol. 27, No. 6, November 1984, pp. 3275-3278, the disclosure of which is hereby incorporated by reference. Data transferred to the control unit for recording is referred to as logical or uncompressed data. Data that has already been compressed in the tape drive control unit is referred to as compressed data. Compressed data that has been recorded on a tape cartridge is referred to as physical data. The distinction between logical and physical data is thus the number of bytes (i.e., the amount) of contiguous storage space on the tape cartridge that is required to store the data. Logical data to be written on a tape cartridge is transferred from a host processor to the tape drive control unit when a minimum block of 16K bytes of data in uncompressed form. It is compressed by the tape drive control unit and accumulated in compressed form. When a still larger threshold amount of data is accumulated in the control unit buffer 22 the data is physically recorded on a tape cartridge. The data set being written at any given time is referred to as the current data set.

The counters of the tape drive control unit maintain certain statistics used to monitor the amount of tape in a tape cartridge which has been recorded (i.e., the position of the tape). One counter tallies the amount of logical data which has actually been received by the tape drive control unit, another counter tallies the amount of physical data written on the tape cartridge, and yet another counter tallies the number of inter-block gaps in the physical data. As stated previously, the counters are reset each time a tape cartridge is mounted. Access to the information in the counters is achieved by issuance of a READ BUFFERED LOG command. The structure and operation of the counters are known to one of skill in the art.

As stated previously, common DASD 12 stores certain control data structures. DASD 12 includes a migration control data set (MCDS) for migration volumes and a backup control data set (BCDS) for backup volumes. The control data sets are accessed by specifying the record type and record key (VOLSER), the structure and operation of which are known to one of skill in the art. The control data sets maintain certain information on each tape cartridge, including the position of the tape at the end of output from its previous mount in the tape drive. The position thus indicates the total amount of physical data on the tape cartridge, at the end of the previous mount, including actual length of data and inter-record gaps. Also included in the control data set is the total number of logical data bytes requested to be written to the tape cartridge during the current mount. This number does not include inter-record gaps. Finally, the control data set includes the total number of physical data bytes on a tape cartridge, also not including interrecord gaps.

HSM maintains certain statistical information in the main memory of the active host processor. This information includes tallies of the amount of logical data and associated number of blocks which have been sent to the tape drive control unit. Also maintained in main memory is any other information required as will be described.

Figure 2:
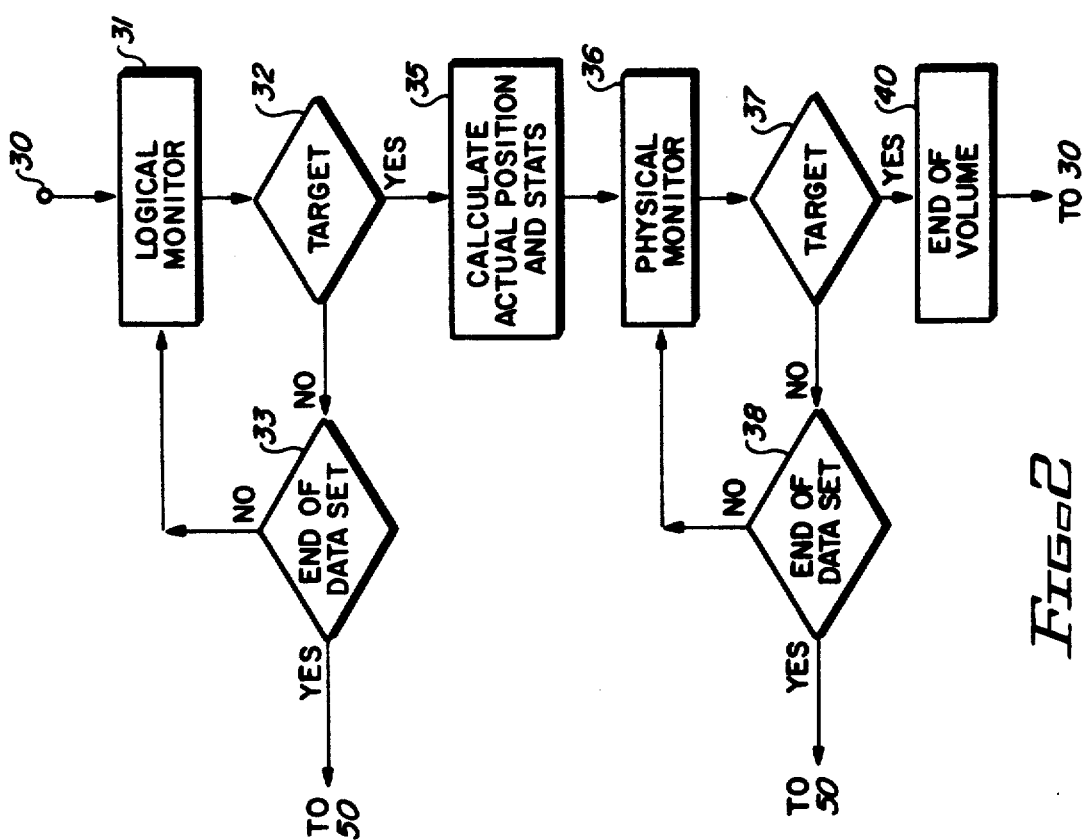
FIG. 2 is a flow diagram illustrating the invention.

Referring to FIG. 2, the method begins at point 30 when a tape cartridge is mounted in the tape drive. At step 31 the host processor transferring the data to the tape cartridge begins to logically monitor the recording. As recording proceeds during step 31 the amount of uncompressed data that is sent to the control unit of the peripheral storage device is tracked in main memory. So long as a target amount of data is not reached during step 31 recording continues. The target is shown at step 32 and may be set to the minimum capacity of a tape cartridge to improve the ability of the cartridge to be copied onto another single cartridge, or may be set to any predetermined level desired by the storage administrator. So long as the target is not met, recording will continue until the end of the data set is reached at step 33. When the end of a data set is reached the branch step 33 directs the flow of operations to point 50 in FIG. 3.

When the end of a data set is reached, the method reaches step 51 wherein the actual position on the tape, or amount of physical data thereon, is calculated. The actual position is calculated by extracting the counts from the control unit for use by the recording host processor. The amount of tape storage space used during the current mount is calculated by summing together the amount of physical data written, the number of inter-block gaps in the physical data, and the amount of logical data which has been sent to the tape drive control unit, less the amount of logical data actually recorded on a tape cartridge (the last two amounts normally being equal). The amount of storage space used is then added to any previous tally of the position of the tape from any previous mounts of the tape cartridge. The position of the tape is then stored in the control data set for the particular tape cartridge in common DASD 12. Should the tape cartridge be removed from tape drive 17 and then later reinserted to add more data to the data volume, the tally stored in the controlled data set will enable the subject method to continue where it left off upon the last time the data cartridge was written to. At step 52, the estimated number of uncompressed data bytes in the next user data set to be written to the tape cartridge is added to the calculated actual position of step 51. The sum is an estimate of the position of the tape following the recording of the next user data set to be written.

At step 53, the sum determined in step 52 is reviewed to determine whether or not the next data set will produce a potential spanning problem. Two characteristics of the information received in step 52 are reviewed. First, the size in uncompressed bytes of the estimated next data set to be written is checked to determine whether or not it is smaller or larger than a size set by the user, which in the preferred embodiment is eight megabytes. If the estimated uncompressed size of the next data set to be written is greater than eight megabytes the method returns to point 30 in FIG. 2. This result is due to the fact that a large data set, if used to force the end of a volume and to record on the next tape cartridge, would waste a potentially large amount of space at the end of the current tape cartridge. If the estimated uncompressed size of the next data set is less than or equal to eight megabytes then the logical estimate of the position calculated in step 52 is compared to a predetermined target value. Note that this target may or may not be the same as the target used in step 32. If according to step 53 the size of the next data set to be written would not cause the target to be exceeded, recording is returned to step 30 in FIG. 2. Thus, if the estimate in uncompressed bytes of the data set size is over eight megabytes or if the estimated position of the tape would not exceed the target capacity should this data set be written to the tape, writing of the data set to the current tape cartridge continues at point 30 of FIG. 2. However, if the estimated output size is smaller or equal to eight megabytes and if the current estimated position of the tape cartridge if the data set were written would cause the target capacity to be exceeded, the end of the volume is forced (FEOV) at step 54, and the tape cartridge is demounted in favor of a new tape cartridge which is mounted before recording of the next data set continues. Such continued recording on the new tape cartridge would then return to point 30 in FIG. 2.

Assuming that the end of a data set was not reached at step 33, or that the end of a data set was reached in step 33 but that operations returned to step 31, writing to the current tape cartridge will continue until the target is met at step 32. Once the target is reached in step 32 operations continue to step 35 wherein the actual position of the tape cartridge, or the amount of physical bytes of data thereon, and certain statistics are calculated. The calculation of the actual position of the tape is the same as that already described in step 51. In addition, step 35 includes calculating statistics which will be needed for further monitoring of recording on the current tape cartridge. The statistics include calculation of the compression percentage for the current data set. The compression percentage is the ratio expressed in percentage form of the amount of compressed data bytes recorded for a data set to the amount of uncompressed data bytes for that recorded data. More particularly, the ratio is the number of physical data bytes and interblock gaps divided by the number of logical data bytes and blocks sent to the tape drive control unit, all of which numbers are accessible in main memory or the tape drive control unit. The compression percentage for the data set is used to predict the number of bytes required on the data cartridge to store the remaining unrecorded logical bytes in the current data set.

At step 36 recording continues and is physically monitored. By physical monitoring it is meant that the compression percentage is used by the recording host processor to estimate the number of physical data bytes required to record the uncompressed bytes it is sending to the control unit. At step 37, as recording continues the estimated position of recording in compressed data bytes is compared to a target value. Once again the target value at step 37 may be the same or different from the target used in step 32 or in previous step 53. So long as the target is not met, recording continues at step 38 which like step 33 detects the end of a data set which has been recorded. So long as the end of a data set is not detected recording continues at steps 36 and 37. However, when the end of a data set is detected operations are again transferred to point 50 in FIG. 3. From point 50, the method continues as previously described.

Assuming the end of a data set is not detected at step 38, physical monitoring continues at steps 36 and 37. When the target of step 37 is reached, indicating that further recording would likely cause the tape cartridge to be impossible to copy onto another single tape cartridge, the end of volume is forced at step 40 and operations are returned to step 30 with the insertion of a new tape cartridge. Note that the end of volume forced at step 40 does not necessarily account for tape spanning, the target could be met in the middle of a data set.

Figure 3:
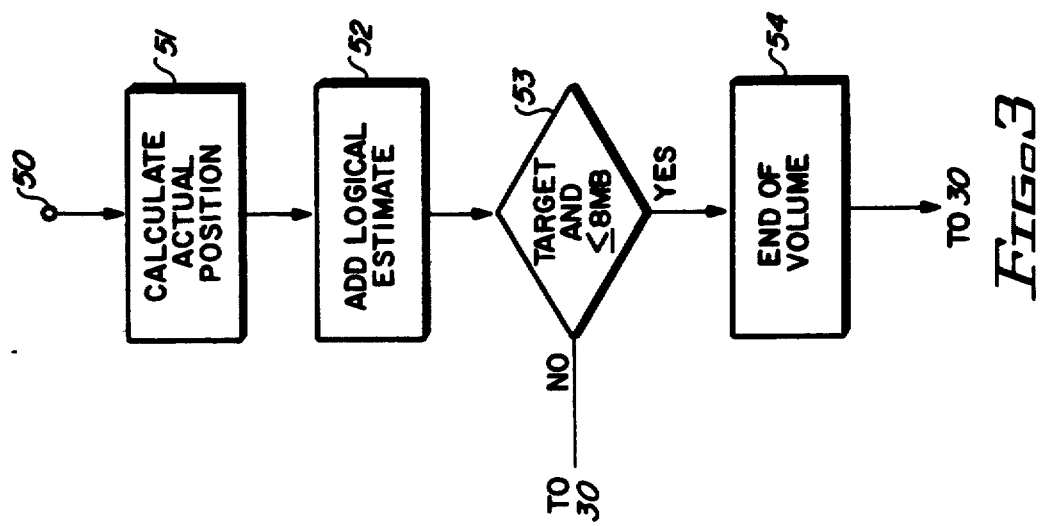
FIG. 3 is a flow diagram which connects with that of FIG. 2.

In performing the operations of FIGS. 2 and 3, the control unit information that is extracted from the tape drive control unit needs to be accurate. However, it is possible for the operating system to occasionally unload such information therein to error recording and reporting software. After the operating system has caused the information to be unloaded for error recording purposes, the counters are typically reset. Because the storage management program is not able to access the error recording program it is necessary for the method to include detecting when the information in the tape drive control unit is inaccurate. This check is not shown in any of the figures for convenience, but is performed anytime access to such information is required. Detection of the inaccuracy of the information is accomplished by maintaining in main memory the number of uncompressed data bytes written to the tape cartridge during a continuous mount of the tape. This number should equal the count of such maintained in the tape drive control unit. By comparing the two counters, it is possible to determine if a reset has occurred in the tape drive control unit.

Once the loss of the tape drive control unit information has been detected the loss must be accounted for. Two methods of adjustment are possible. In the first such method, when a difference in the counters is detected it is assumed that all data that has been recorded on the recording media is in fact uncompressed data. That is, the number of compressed bytes recorded on the recording media is set to equal the number of uncompressed bytes detected by the host processor as recording was occurring. The other method, which is the preferred embodiment, includes the same kind of assumption, but only for those bytes that are missing from the counter. Thus, if main memory indicates a particular byte count and the tape drive control unit was reset during that count, the tape drive control unit will indicate a smaller number or subset of the main memory count. At such time the physical or compressed data count present in the tape drive control unit will be assumed to be accurate to the extent that it applies only to the count that is shown in uncompressed form in the buffer. The remaining bytes, i.e., the difference in the uncompressed data byte count in main memory and in the tape drive control unit, can be accounted for by assuming that no compression took place. In such way the loss of data in the tape drive control unit can be accounted for.

While the invention has been particularly shown and described with reference to a preferred embodiment thereof, it will be understood by those skilled in the art that various changes in form and details may be made therein without departing from the spirit and scope of the invention. For example, the subject method can be used with various types of recording media other than magnetic tape, such as magnetic and optical disks. Accordingly, the methods should be limited only as specified in the following claims.

What is claimed is:

1. A peripheral data storage subsystem for using recording media efficiently, said peripheral data storage subsystem having a first recording medium mounted in a first peripheral data storage device and a second recording medium mounted in a second peripheral data storage device, the first recording medium having physical data stored therein and having a total physical data amount associated therewith, and wherein said peripheral data storage subsystem ensures the first recording medium's physical data is fully copyable onto the second recording medium, said peripheral data storage subsystem coupled to a host processor for receiving logical data of a current data set therefrom and converting the logical data into compressed data of the current data set, said peripheral data storage subsystem comprising:

a plurality of counters for tallying a logical data amount of the logical data of the current data set, and for tallying a compressed data amount of the compressed data of the current data set; and a control unit including:

means coupled to said plurality of counters and said host processor for receiving the logical data of the current data set and compressing the logical data into the compressed data;

means for calculating a compression ratio from the compressed data amount and the logical data amount;

means for using the compression ratio for determining an estimated physical data amount, the estimated physical data amount being used to determine whether writing the current data set to the first recording medium would exceed a copy limit of the first recording medium such that the contents of the first recording medium would not be fully copy-able and forcing an end-of-volume if the copy limit is exceed; and means for writing the compressed data to the first recording medium as current physical data if the copy limit is not exceeded and adding a current physical data amount of the current physical data to the total physical data amount associated with the first recording medium for determining an updated total physical data amount.

2. The peripheral data storage subsystem according to claim 1 wherein said control unit compares the logical data amount of the current data set to a target stored therein and determine the compression ratio only if the target is exceeded.

3. The peripheral data storage subsystem according to claim 2 wherein said control unit writes the compressed data to the second recording medium if an end-of-volume was forced.

4. The peripheral data storage subsystem according to claim 3 wherein said control unit includes means for resetting said plurality of counters upon removal of the first recording medium from said first peripheral data storage device.

5. The peripheral data storage subsystem according to claim 4 wherein said control unit includes means for causing the updated total physical data amount to be stored in a control data set in a storage device coupled to the host processor, and causing the updated total physical data amount to be recalled to said control unit upon re-mounting the first recording medium onto said first peripheral data storage device.

6. A tape drive subsystem for using a plurality of tape cartridges efficiently, said tape drive subsystem having a first tape cartridge mounted in a first tape device and a second tape cartridge mounted in a second tape device, the first tape cartridge having physical data stored therein and having a total physical data amount associated therewith, and wherein said tape drive subsystem ensures the first tape cartridge's physical data is fully copy-able onto any other of the plurality of tape cartridges, said tape drive subsystem coupled to a host processor for receiving logical data of a current data set therefrom and converting the logical data into compressed data of the current data set, said tape drive subsystem comprising:

a buffer;

a plurality of counters coupled to said buffer, including a first counter for tallying a logical data amount of the logical data of the current data set, and including a second counter for tallying a compressed data amount of the compressed data of the current data set; and a control unit including:

means coupled to said plurality of counters and said host processor for receiving the logical data of the current data set and compressing the logical data into the compressed data;

means for calculating a compression ratio from the compressed data amount and the logical data amount;

means for using the compression ratio for determining an estimated physical data amount, the estimated physical data amount being used to determine whether writing the current data set to the first tape cartridge would exceed a copy limit of the first tape cartridge such that the physical data stored on the first tape cartridge would not be fully copy-able and forcing an end-of-volume if the copy limit is exceeded; and means for writing the compressed data to the first tape cartridge from said buffer as current physical data if the copy limit is not exceeded and adding a current physical data amount of the current physical data to the total physical data amount of the first tape cartridge for determining an updated total physical data amount.

7. The tape drive subsystem according to claim 6 wherein said control unit compares the logical data amount of the current data set to a target stored therein and determines the compression ratio only if the target is exceeded.

8. The tape drive subsystem according to claim 7 wherein said control unit writes the compressed data from said buffer to the second tape cartridge if an end-of-volume was forced.

9. The tape drive subsystem according to claim 8 wherein said control unit includes means for resetting said plurality of counters upon dis-mounting the first tape cartridge from said first tape device.

10. The tape drive subsystem according to claim 9 wherein said control unit includes means for causing the updated total physical data amount to be stored in a control data set in a storage device coupled to the host processor, and causing the updated total physical data amount to be recalled back to said control unit upon re-mounting the first tape cartridge onto said first tape device.

* * * * *

UNITED STATES PATENT AND TRADEMARK OFFICE
CERTIFICATE OF CORRECTION

PATENT NO. : 5,235,695
DATED : August 10, 1993
INVENTOR(S) : J. W. Pence

It is certified that error appears in the above-identified patent and that said Letters Patent is hereby corrected as shown below:

At column 12, line 3, the word "exceed" should be --exceeded--.

At column 12, line 14, the word "determine" should be --determines--.

Signed and Sealed this

Nineteenth Day of April, 1994

Attest:

BRUCE LEHMAN

Attesting Officer

Commissioner of Patents and Trademarks